Nov. 5, 1929.　　　　E. C. HEAD　　　　1,734,254
APPARATUS FOR RELIEVING TAPER HOBS
Filed June 30, 1927　　　2 Sheets-Sheet 1
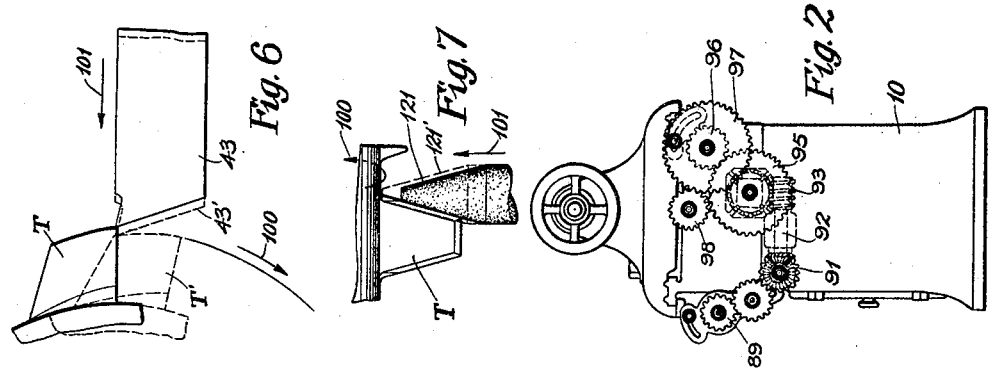
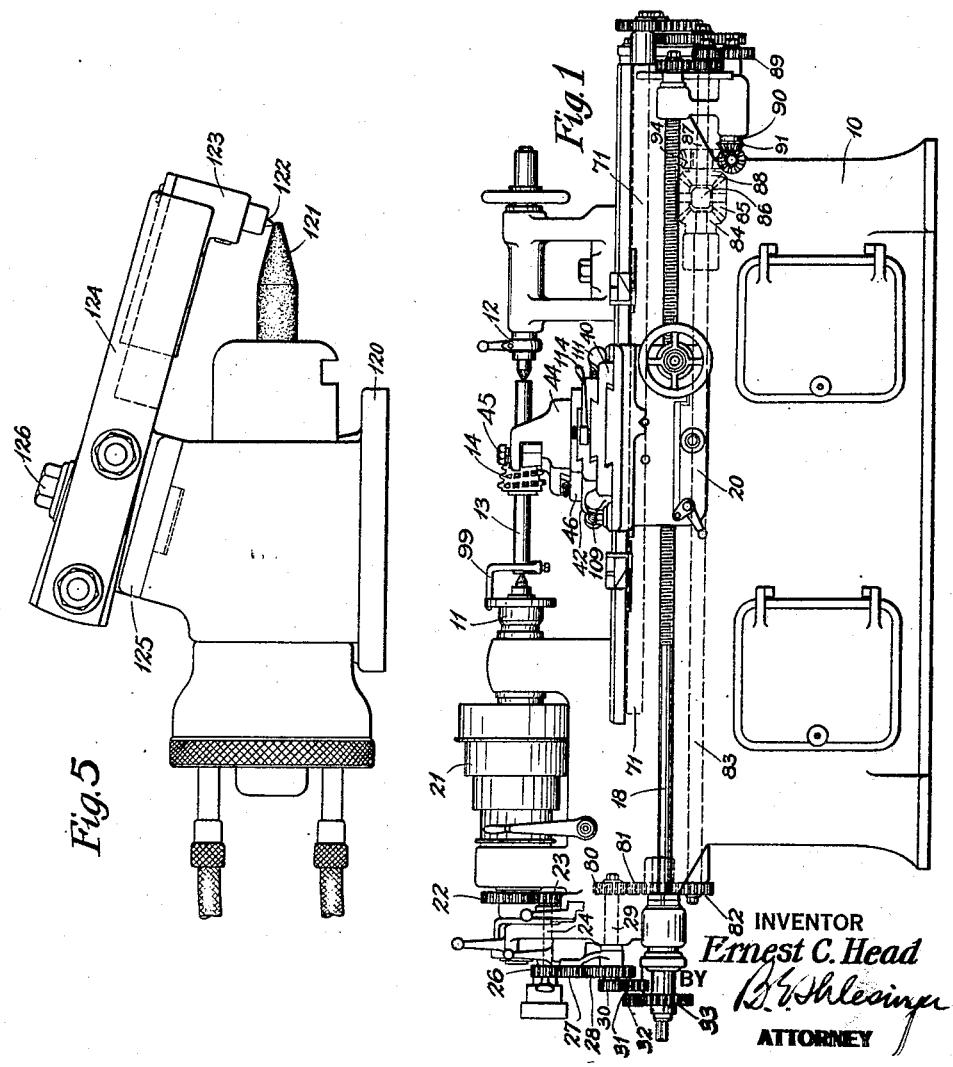
INVENTOR
*Ernest C. Head*
BY
*B. F. Schlesinger*
ATTORNEY Nov. 5, 1929.  E. C. HEAD  1,734,254
APPARATUS FOR RELIEVING TAPER HOBS
Filed June 30, 1927    2 Sheets-Sheet 2

INVENTOR
Ernest C. Head
BY
ATTORNEY

Patented Nov. 5, 1929

1,734,254

UNITED STATES PATENT OFFICE

ERNEST C. HEAD, OF ROCHESTER, NEW YORK, ASSIGNOR TO GLEASON WORKS, OF ROCHESTER, NEW YORK, A CORPORATION OF NEW YORK

APPARATUS FOR RELIEVING TAPER HOBS

Application filed June 30, 1927. Serial No. 202,695.

The purpose of the present invention is to provide apparatus for relieving taper hobs. One object of the present invention is to provide an apparatus for relieving taper hobs which may form an attachment for a lathe or similar machine and which can be operated from the mechanism usually employed on such a machine. A further object of this invention is to provide a mechanism for effecting a relieving movement between the tool and work in a direction perpendicular to the cone surface of the work, whereby any tendency of the tool to slip sidewise, due to the conical nature of the work, will be avoided. Other objects of this invention are to provide a relieving apparatus which will be simple in form, which can be easily and cheaply constructed, and upon which a taper hob can be accurately and expeditiously relieved. To these and other ends, the invention consists in certain improvements and combinations of parts all as will be hereinafter more fully described, in the specification and pointed out in the claims appended hereto.

In the drawings:

Figure 1 is a side elevation of a lathe, equipped with a taper hob relieving attachment constructed according to this invention;

Figure 2 is an end elevation thereof;

Figure 5 is a side elevation of a detachable grinding unit, which may be employed in finishing the relieved surfaces of the hub teeth;

Figure 6 is a diagrammatic view showing the relative movement between the tool and blank during the relieving of the tips of the hob teeth; and Figure 7 is a diagrammatic view showing the relative motions of tool and blank during the relieving of the sides of the hob teeth.

Figure 3:
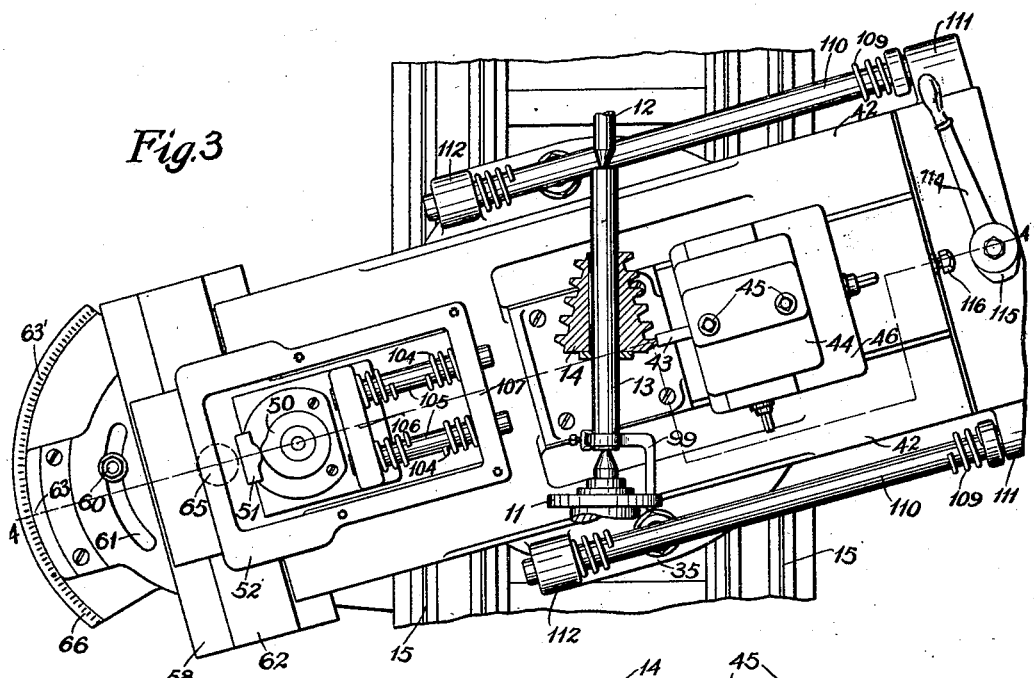
Figure 3 is a fragmentary plan view, on an enlarged scale, of the lathe, showing particularly the relieving attachment.

One purpose of the present invention is to provide a relieving apparatus which may be employed as a removable attachment upon a lathe or similar machine tool and it is in this connection that the present invention is illustrated in the accompanying drawings. It will be understood, however, that the novel features and improvements of the present invention may be embodied, if desired, in a machine designed especially to function according to this invention.

In the embodiment illustrated, 10 designates the bed or frame of a lathe of the usual construction. The lathe is provided with a head stock, driving plate and center designated generally at 11 and a tail stock, clamp and center designated generally at 12. The work spindle or arbor 13, carrying the taper hob 14, to be relieved, is mounted between the two centers. The bed or frame 10 of the lathe is provided with horizontal ways or guides 15 upon which slides a table or carriage 16. The table 16 is reciprocable longitudinally of the work spindle or arbor 13 by means of a screw 18 which engages a nut 19 secured to a depending apron 20 which is fastened to the table or carriage 16.

A set of cone pulleys serve to rotate the blank spindle and the screw 18 and to operate the machine. These pulleys, designated collectively at 21, are operatively connected with the head stock spindle and drive through the gears 22, 23, the shaft 24, the gears 26, 27 and 28, the shaft 29, and the gears 30, 31, 32 and 33, the screw shaft 18.

The table or carriage 16 serves to support the relieving apparatus of the present invention. Mounted on this table or carriage 16 for angular adjustment thereon is a plate 35 which is provided with an annular flange 36 that seats in a circular groove or socket 37 formed in the upper face of the table 16. Slidably mounted on the plate 35 and reciprocable thereon is a carrier 40. Mounted on the carrier 40 and guided by a dovetail connection therewith, is a slide 42, upon which the relieving tool is adjustably mounted.

In Figures 1, 2 and 3, the tool 43 shown is a cutting tool. This tool is securely held in a holder 44 by means of set screws 45. The holder 44 is adjustable upon a support 46 by means of a screw 47 and the support 46 is in turn adjustable upon the slide 42 in a direction at right angles to the adjustment of the holder 44 by means of a screw 48. These two adjustments of the tool permit of positioning the tool for relieving hobs of different diameters and of different pitches.

For relieving a hob, the hob is rotated on its axis, the table 16 is actuated by the screw 18 to move the tool longitudinally of the hob and simultaneously the slide 42 is reciprocated to impart the relieving motion to the tool 43. The reciprocating or relieving motion of the slide 42 is effected by means of a snail cam 50 which is rotated continuously during the operation of the machine and which engages a contact member or follower 51 that is secured to the housing 52 which is secured to or formed integral with the slide 42. The cam 50 moves the slide 42 and the tool 43 mounted thereon gradually toward the hob being relieved and suddenly away from it, the slide being reciprocated once for each tooth on the hob, that is, a plurality of times in each revolution of the hob.

If the slide 42 were positioned so as to move perpendicularly of the axis of the hob spindle or arbor 13, there would be a tendency on the part of the relieving tool 43 to slip sidewise during the relieving action, because of the taper of the cone surface of the hob. Any such slipping might seriously interfere with the relieving operation and would certainly affect the accuracy of the relieved hob. The present invention avoids these difficulties by providing means for adjusting the tool slide 42 and for guiding it during its movement longitudinally of the work so that the tool reciprocates in a plane perpendicular to the cone surface of the work. To this end, the plate 35 previously mentioned is provided and this plate is arranged to be angularly adjustable on the table 16 so that the slide 42 can be positioned in a plane perpendicular to the cone surface of the hob. The amount of angular adjustment of the plate 35 depends, of course, upon the cone angle of the hob. A taper attachment is also provided which serves to guide the carrier 40 during the movement of the table 16 and gradually feed this carrier relative to the hob in a direction perpendicular to the cone surface of the work. During the movement of the carriage 16, then, the tool 43 is caused to move perpendicularly of the cone surface of the work and is maintained in operative relation with the work, despite the increase or decrease in the diameter of the hob blank from one end to the other.

The taper attachment is mounted on a bracket 55 which is adjustably secured to the bed 10 of the machine by T-bolts 56 which engage in T-slots 57 formed in the bed. Pivotally adjustable on the bracket 55 is a guide plate 58. The plate 58 is provided with a stud 59 which is journaled in a socket or recess in the bracket 55 so that the guide plate may be swivelled at any desired angle relative to the axis of the work spindle or arbor 13. The guide plate may be secured in any adjusted position by means of bolts 60 which pass through the circular slots 61 formed in the guide plate concentric with the stud 59. The guide plate is provided with a dovetailed guide-rail 62 which is adapted to be engaged by a suitably recessed slide or follower 64 which is connected through the pivot pin 65 with an extension of the carrier 40.

The guide-plate 58 has an index mark 63 readable against a suitable scale 63' formed on a circular flange 66 of the bracket 55 and by this means the guide plate 58 can be accurately set to the required angle relative to the work spindle or arbor 13, depending on the cone angle of the hob, so that the dove-tailed guide 62 is parallel to the cone surface of the work and so that as the table 16 moves on the base 10 under actuation of the screw 18, the carrier 40 and with it the tool 43 will be slowly fed into or away from the hob axis in a direction perpendicular to the cone surface of the hob.

The means for rotating the hob and moving the table 16 have already been described. The relieving cam 50 is rotated in timed relation with the hob rotation and table movement, as is required to properly relieve the teeth of the hob. The cam 50 is mounted on a shaft 70 which is journaled in suitable bearings in an extension of the carrier 40. This shaft 70 is rotated continuously during the operation of the machine, being driven, in the embodiment disclosed, from the shaft 71 which extends longitudinally of the base 10 and which is part of the usual structure of a lathe, by suitable gearing, including the bevel gear 72 which has a splined connection with the shaft 71, the gear 73 meshing therewith, the shaft 74, journaled concentrically of the flange 36 of the adjustable plate 35, the bevel gear 75, the bevel gear 76 which is journaled in a suitable bearing in the plate 35, the shaft 77 which has a splined connection adjacent one end with the gear 76 and is journaled adjacent its opposite end in a suitable bearing in the extension of the carrier 40, the bevel gear 78 secured to this shaft 77, and the bevel gear 79 meshing therewith and secured to the shaft 70.

The shaft 71 is rotated in timed relation with the work rotation and the rotation of the lead screw 18. Mounted on the shaft 29 (Fig. 1) adjacent one end is a gear 80 forming one of a set of change gears 80, 81, 82, which transmit the rotation of the shaft 29 to the differential shaft 83 and rotate this differential shaft 83 at the same relative speed as the blank spindle 13. The differential shaft 83 carries at its further end a bevel gear 84 forming one of a set of differential gears, of which the planet members 85 are mounted upon a spider 86 which is connected with the shaft 87, and of which the other side gear 88 is journaled on the shaft 87 and is rotated by means of the change gears 89, the shaft 90, the bevel gear 91, the shaft 92, the worm 93, and the worm wheel 94 from the lead screw 18. The spider 86 thus receives a motion which is in timed relation to the work spindle and lead screw rotations and transmits this rotation to the shaft 87, whence it is transmitted by the change gears 95, 96, 97, and 98 to the shaft 71 and thence through the gearing already described to the cam 50.

The operation of the mechanism, thus far described, may be briefly explained as follows: The taper hob 14 to be relieved is mounted upon the spindle or arbor 13 which is secured between the centers of the machine and connected through the driver 99 with the head stock spindle so as to be rotated therewith. The plate 35 is angularly adjusted upon the table 16 so as to position the slide 42 for movement perpendicular to the cone surface of the hob and the guide plate 58 of the taper attachment is also angularly adjusted on the bracket 55 so that the guide 62 will be parallel to the cone surface of the hob and the carrier 40 will move perpendicular to the cone surface of the hob during the movement of the table or carriage 16. The plate 35 may be provided with any suitable scale, so that it can be set accurately to the desired angle, while the scale 63' permits of setting the taper attachment guide plate 58 to the desired angle. The machine may then be started. The work spindle or arbor 13 is rotated from the pulley 21 by means of the head stock spindle and driver 99. Simultaneously, the tool is moved longitudinally of the hob by movement of the table or carriage 16 under actuation of the lead screw 18, the lead screw being driven from the pulley shaft by the gears 22, 23, 26, 27, 28, 30, 31, 32 and 33, as already described. The gears 30, 31, 32 and 33 constitute a set of change gears and are selected according to the lead of the thread of the hob. Simultaneously with the hob rotation and the movement of the table 16, a relieving motion is imparted to the tool through the snail cam 50, the contact member 51 and the slide 42.

The rotation of the cam 50 causes the relieving tool to be fed slowly toward the hob, for each tooth of the hob and then to be moved suddenly away from it. This action is illustrated diagrammatically in Fig. 6. In this figure, the relieving tool is shown in position for relieving the tips or top surfaces of the hob teeth, but the relative action is the same when relieving the sides of the hob teeth. T designates a tooth of the hob. The heavy black lines indicate the position of this tooth when it is engaged by the relieving tool 43. The hob is rotating in the direction of the arrow 100 and the relieving tool is fed in toward the hob by the cam 50 in the direction of the arrow 101. When the relieving action has been completed, the tooth has assumed the dotted line position T' and the tool the dotted line position 43'.

The movement of the slide 42, for the relieving action, toward the hob compresses the springs 104 on the guide rods 105 which are secured in a flange 106 of the carrier 40 and are guided in apertures of a flange 107 of the slide 42. These springs act to return the slide 42 to original position after each tooth of the hob has been relieved. The cam, as already described is rotated in timed relation with the hob rotation and the lead screw rotation through the differential gears 84, 85 and 88, the shaft 87, the change gears 95, 96, 97 and 98, the shaft 71, the gears 72, 73, the shaft 74, the gears 75, 76, the shaft 77, the gears 78, 79 and the shaft 70. The change gears 95, 96, 97, 98 are selected in accordance with the number of flutes or gashes of the hob. The tool slide 42 is reciprocated once for each tooth of the hob and the hob rotates continuously and slowly and the table or carriage 16 moves continuously and slowly in timed relation with the reciprocatory movements of the tool and in accordance with the lead of the hob thread. As the table or carriage 16 moves slowly longitudinally of the hob, the carrier 40 is fed in toward the hob under actuation of the guide member 58 and follower 64 of the taper attachment. The splined connection between the shaft 77 and the gear 76 permits of this movement without affecting the rotation of the cam 50, while the splined connection between the gear 72 and the shaft 71 enables the cam to be rotated continuously during the longitudinal movement of the table 16. The coil springs 109 mounted on the rods 110 which are secured to brackets 111 integral with the carrier 40 and which slide in guides 112 integral with the plate 35 serve to absorb any tendency to vibration of the carrier 40 during its movement under actuation of the guide 62 and also to return the carrier 40 to original position during the return movement of the table 16 for another operation upon the teeth of the hob.

When the tool has completed its traverse from one end of the hob to the other, the direction of movement of the table 16 is reversed and the tool returned to original position for the taking of another relieving cut upon the teeth or for a separate relieving operation. The reversing mechanism has not been shown but may be of any usual or suitable structure, such as that commonly employed in lathes and machine tools of similar character. The return movement ordinarily takes place at a greater speed than the operating stroke of the table or carriage 16 so as to avoid unnecessary idle time. During the return stroke of the carriage 16 it is preferable to disengage the contact member 51 from the cam 50.

For this purpose, the lever arm 114 is provided. This lever arm is pivotally mounted on the carrier 40 and is provided with a cam surface 115 adapted to contact with a set screw 116 which is carried by the slide 42. This lever arm can be swung around by the operator to engage the cam surface 115 with the set-screw 116 and move the slide 42 to disengage the contact member or follower 51 from the cam 50 so that during the return movement of the table 16 the cam will not transmit any movement of the slide 42.

Figure 4:
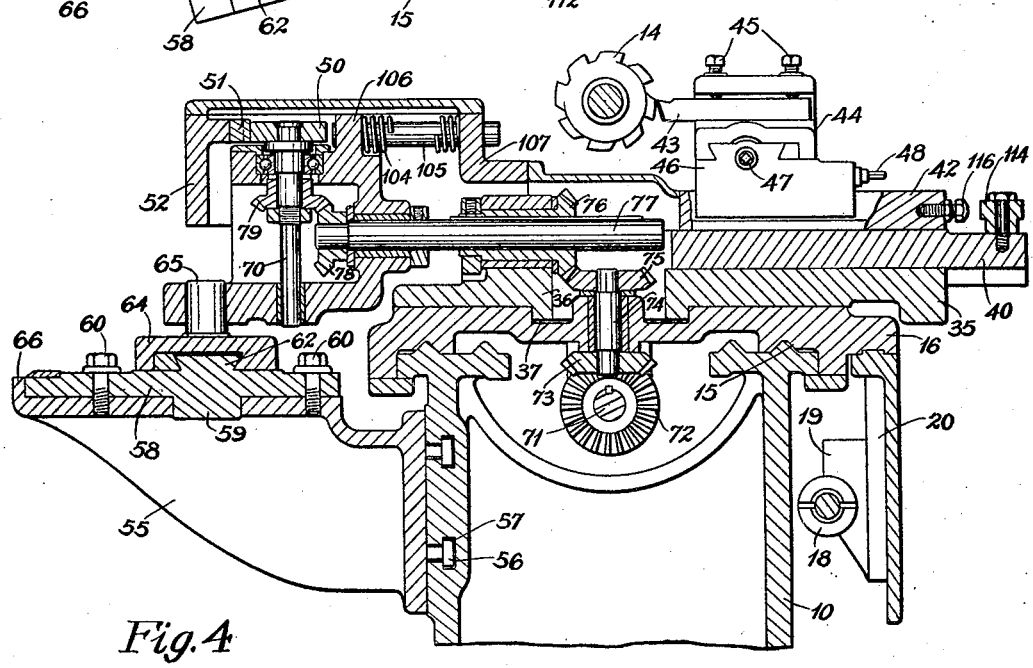
Figure 4 is a section on the line 4—4 of Figure 3.

The side surfaces and tips of the teeth of the hobs may be relief ground with the apparatus of the present invention by substituting a suitable grinding tool and support therefor for the tool holder 44 shown in Figures 1, 3 and 4. Figure 5 shows a grinding attachment or unit which might be substituted for the relieving tool 43 and its holder 44 in order to relief grind the tips and side surfaces of the hob. This attachment comprises a holder 120 which may be substituted for the holder 44 and a pencil grinding wheel 121 rotated at high speed by an air turbine housed within the holder or support 120. The pencil wheel 121 may be dressed while in position by means of the diamond 122 which is mounted upon the slide 123 which is reciprocable in the arm 124. The arm 124 is angularly adjustable upon a swivel member 125 so that the diamond can be positioned at the correct angle for dressing pencil wheels of varying cone angles. The swivel member 125 itself swivels or pivots about the axis of the bolt 126 permitting of swinging the diamond carried away from the work after the wheel has been dressed.

Figure 7 illustrates diagrammatically the relief grinding of the side tooth surfaces of the hob. The hob is rotating on its axis continuously in the direction of the arrow 100 and the pencil wheel 121 is rotated on its axis continuously at a very high speed and is moved toward the hob under actuation of the cam 50 through the mechanism already described. When the pencil wheel engages the hob tooth T it is in the full line position shown in this figure and it is moved from this position to the dotted line position 121′ as the hob tooth rotates and the lead screw 18 rotates and during its engagement with the tooth T. Thus the side faces of the teeth of the hob are relieved from front to rear. As soon as the relieving operation has been completed the cam 50 permits the grinding wheel to be returned to full line position and it does this quickly under actuation of the springs 104. This gradual feed in and quick return movement takes place for each successive tooth of the hob. The relief grinding of the tips of the hob teeth is effected in the same way as the relieving of those teeth as shown in Figure 6, save for the fact that the tool is a grinding wheel which is rotated continuously during the relieving action.

While I have described my invention in connection with certain specific embodiments, it will be understood that this invention is capable of various further modifications without departing from the intent of the invention and that this application is intended to cover any adaptations, uses, or embodiments, following in general, the principles of the invention and including such departures from the present disclosure as come within known or customary practice in the art and may be applied to the essential features hereinbefore set forth and as fall within the scope of the invention or the limits of the appended claims.

Having thus described my invention, what I claim is:

1. In apparatus for relieving taper hobs, a tool support, a rotatable work support, a carriage on which one of said supports is mounted, means for positioning the tool support so that it will move in a plane perpendicular to the cone surface of the work, means for moving the carriage in a direction longitudinally of the work, means for rotating the work support on its axis, means for simultaneously imparting a relieving motion to the tool support in timed relation with the work and carriage movements, and means for imparting a relative feed movement between the tool and work in a direction perpendicular to the cone surface of the work as the carriage moves longitudinally.

2. In apparatus for relieving taper hobs, a bed, a reciprocable tool slide, a rotatable work spindle, a movable carrier upon which the tool slide is reciprocable, a carriage movable on the bed in a direction longitudinally of the work, a plate, on which the carrier is slidable, angularly adjustable on the carriage to position the carrier and slide for movement in a direction perpendicular to the cone surface of the work, means for moving the carriage longitudinally of the work, means for rotating the work spindle on its axis, means for imparting a relieving movement to the tool slide in timed relation with the work and carriage movements, and means on the bed for imparting a feed movement to the carrier in a direction perpendicular to the cone surface of the work, as the carriage moves longitudinally.

3. In apparatus for relieving taper hobs, a bed, a rotatable work spindle journaled in the bed, a reciprocable tool slide, a slidable carrier upon which the tool slide is reciprocable, a carriage movable on the bed in a direction longitudinally of the work, a plate, on which the carrier is slidable, angularly adjustable on the carriage, to position the carrier and slide for movement perpendicularly of the cone surface of the work, means for moving the carriage longitudinally of the work, means for rotating the work spindle on its axis, means for imparting a relieving movement to the tool slide in timed relation with the work spindle and carriage movements, a guide member angularly adjustable on the bed into a position parallel to the cone surface of the work, and a follower carried by the carrier adapted to engage said guide, for imparting a feed movement to said carrier in a direction perpendicular to the cone surface of the work as the carriage moves longitudinally.

4. In apparatus for relieving taper hobs, a reciprocable tool support, a rotatable work support, a carriage on which one of said supports is mounted, means for positioning the tool support so that it will move in a direction perpendicular to the cone surface of the work, means for moving the carriage in a direction longitudinally of the work, means for rotating the work support on its axis, a cam for reciprocating the tool support, means for continuously rotating the cam in timed relation with the work and carriage movements, and means for imparting a relative feed movement between tool and work in a direction perpendicular to the cone surface of the work as the carriage moves longitudinally.

5. An attachment for a lathe provided with a rotatable work spindle, a slidable carriage movable in a direction longitudinally of the work, a lead screw for moving the carriage, means for rotating the work spindle, and a shaft driven in timed relation with the work spindle and carriage movements, said attachment comprising a reciprocable tool slide, a cam shaft driven from the first named shaft and carrying a cam for reciprocating the tool slide, a carrier on which the slide is reciprocable, a plate, on which the carrier is mounted, adapted to be angularly adjusted on the carriage to position the tool slide for movement in a direction perpendicular to the cone surface of the work and means for imparting a relative feed movement to said carrier in a direction perpendicular to the cone surface of the work as the carriage moves longitudinally.

6. An attachment for a lathe provided with a bed, a rotatable work spindle, a slidable carriage movable on the bed in a direction longitudinally of the work, means for moving the carriage, means for rotating the work spindle and a shaft driven in timed relation with the work spindle and carriage movements, said attachment comprising a reciprocable tool slide, means driven from said shaft for reciprocating said slide, a movable carrier, on which the slide is slidable, a plate, on which the carrier is mounted, angularly adjustable on the carriage to position the slide and carrier for movement in a direction perpendicular to the cone surface of the work and co-operating means on the carrier and the bed for imparting movement to the carrier as the carriage moves longitudinally.

7. An attachment for a lathe provided with a rotatable work spindle, a slidable carriage movable in a direction longitudinally of the work, a lead screw for moving the carriage, means for rotating the work spindle, and a shaft driven in timed relation with the work and carriage movements, said attachment comprising a reciprocable tool slide, a cam shaft driven by the first named shaft and a cam thereon for reciprocating the tool slide, a carrier on which said slide is reciprocable, a plate, on which the carrier is mounted, adapted to be angularly adjusted on the carriage to position the tool slide and carrier for movement in a direction perpendicular to the cone surface of the work, a bracket secured to the bed of the lathe, a guide member adjustable angularly on the bracket, and a follower carried by said carrier and engaging said guide member for imparting a feed movement to said carrier as the carriage moves longitudinally.

8. In apparatus for relieving taper hobs, a bed, a rotatable work support, a slide on which the tool is mounted angularly adjustable to position the tool for movement in a direction substantially perpendicular to the cone surface of the work, a carriage, on which one of said parts is mounted, movable in a direction longitudinally of the work, means for producing a relative relieving movement between the tool and work, and means for moving the slide as the carriage moves longitudinally to produce a relative feed movement between the tool and work.

9. In apparatus for relieving taper hobs, a bed, a rotatable work support, a slide, a carriage, on which one of said parts is mounted, movably in a direction longitudinally of the work, a second slide movable mounted on the first, a tool support mounted on the second slide, said first slide being angularly adjustable to position both slides for movement in a direction substantially perpendicular to the cone surface of the work, means for imparting a relieving movement to one slide and means for simultaneously moving the other slide as the carriage moves longitudinally to feed the tool relative to the work.

10. In apparatus for relieving taper hobs, a rotatable work support, a slide, a carriage, on which one of said parts is mounted, movable in a direction longitudinally of the work, a second slide slidable on the first, a tool support mounted on the second slide, said first slide being angularly adjustable to position both slides for movement in a direction substantially perpendicular to the cone surface of the work, a bracket having a fixed relation to the work support, a guide member angularly adjustable on the bracket, a follower connected to one slide and engaging said guide member to move said slide as the carriage moves longitudinally to feed the tool relative to the work, and means for imparting a relieving movement to the other slide.

11. In apparatus for relieving taper hobs, a bed, a rotatable work support journaled in the bed, a carriage movable on the bed in a direction longitudinally of the work, a slide movable on the carriage, a second slide slidable on the first, a tool support mounted on the second slide, said first slide being mounted on the carriage for angular adjustment thereon to position both slides for movement in a direction substantially perpendicular to the cone surface of the work, a guide member angularly adjustable on the bed, a follower connected to one of the slides and adapted to engage said guide member to move the slide to produce a feed movement of the tool relative to the work during the movement of the carriage, and means for imparting a relieving movement to the other slide.

12. In apparatus for relieving taper hobs, a bed, a rotatable work spindle journaled in the bed, a carriage movable on the bed in a direction longitudinally of the work, a guide member having a straight edge mounted on the bed for angular adjustment relative to the direction of movement of the carriage, a slide movable on the carriage, a second slide slidable on the first, said first slide being angularly adjustable to position both slides for movement in a direction substantially perpendicular to the cone surface of the work, a follower connected to one slide adapted to engage said guide to produce a relative feed movement between the tool and blank in a direction substantially perpendicular to the cone surface of the work as the carriage moves longitudinally and means for imparting a relieving movement to the other slide.

13. An attachment for lathe provided with a bed, a rotatable work spindle, a slidable carriage movable on the bed in a direction longitudinally of the work, means for moving the carriage, means for rotating the work spindle and a shaft driven in timed relation with the work spindle and carriage movements, said attachment comprising a pair of slides angularly adjustable on the carriage for movement in a direction substantially perpendicular to the cone surface of the work, means driven from said shaft for reciprocating one slide to impart a relieving movement to the tool and cooperating means on the bed and other slide for producing movement of said latter slide to feed the tool relative to the work as the carriage moves longitudinally.

ERNEST C. HEAD.